United States Patent
Miyamoto et al.

(10) Patent No.: US 10,965,087 B2
(45) Date of Patent: Mar. 30, 2021

(54) LASER DEVICE

(71) Applicant: Gigaphoton Inc., Tochigi (JP)

(72) Inventors: Hirotaka Miyamoto, Oyama (JP); Osamu Wakabayashi, Oyama (JP)

(73) Assignee: Gigaphoton Inc., Tochigi (JP)

( * ) Notice: Subject to any disclaimer, the term of this patent is extended or adjusted under 35 U.S.C. 154(b) by 25 days.

(21) Appl. No.: 16/266,279

(22) Filed: Feb. 4, 2019

(65) Prior Publication Data

US 2019/0173258 A1 Jun. 6, 2019

Related U.S. Application Data

(63) Continuation of application No. PCT/JP2016/078540, filed on Sep. 27, 2016.

(51) Int. Cl.
*H01S 3/08* (2006.01)
*H01S 3/03* (2006.01)
(Continued)

(52) U.S. Cl.
CPC ......... *H01S 3/08009* (2013.01); *H01S 3/03* (2013.01); *H01S 3/08031* (2013.01);
(Continued)

(58) Field of Classification Search
CPC ............. H01S 3/08009; H01S 3/08031; H01S 3/08054; H01S 3/03; H01S 3/08;
(Continued)

(56) References Cited

U.S. PATENT DOCUMENTS

| 4,127,828 A | 11/1978 | Klauminzer |
| 5,177,750 A | 1/1993 | Zorabedian |

(Continued)

FOREIGN PATENT DOCUMENTS

| CN | 102969649 A | 3/2013 |
| JP | 2003518757 A | 6/2003 |

(Continued)

OTHER PUBLICATIONS

International Search Report issued in corresponding International Application No. PCT/JP2016/078540; dated Feb. 7, 2017.

(Continued)

*Primary Examiner* — Xinning(Tom) Niu
(74) *Attorney, Agent, or Firm* — Studebaker & Brackett PC

(57) ABSTRACT

Provided is a laser device that includes a laser chamber in which a pair of discharge electrodes are disposed; a line narrowing optical system including a grating disposed in a position outside the laser chamber; a beam expander optical system that increases a diameter of a light beam, outputted from the laser chamber and traveling toward the grating, in a first direction parallel to a discharge direction between the discharge electrodes and in a second direction orthogonal to the discharge direction; and a holding platform that is formed as a component separate from the laser chamber and the grating, holds the beam expander optical system, and forms along with the beam expander optical system a beam expander unit.

20 Claims, 10 Drawing Sheets

(51) Int. Cl.
*H01S 3/225* (2006.01)
*H01S 3/0971* (2006.01)
*H01S 3/106* (2006.01)

(52) U.S. Cl.
CPC ............ *H01S 3/08054* (2013.01); *H01S 3/08* (2013.01); *H01S 3/08004* (2013.01); *H01S 3/0971* (2013.01); *H01S 3/106* (2013.01); *H01S 3/2251* (2013.01)

(58) Field of Classification Search
CPC .. H01S 3/2251; H01S 3/08004; H01S 3/0971; H01S 3/106
See application file for complete search history.

(56) References Cited

U.S. PATENT DOCUMENTS

| | | | | |
|---|---|---|---|---|
| 6,493,374 B1* | 12/2002 | Fomenkov | .......... | G03F 7/70025 372/102 |
| 2001/0014110 A1* | 8/2001 | Partlo | ....................... | H01S 3/10 372/100 |
| 2001/0028456 A1* | 10/2001 | Nishi | ................. | G03F 7/70866 356/400 |
| 2002/0012374 A1* | 1/2002 | Basting | ................ | H01S 3/1055 372/55 |
| 2006/0274808 A1* | 12/2006 | Luo | ........................ | H01S 3/005 372/72 |
| 2013/0064258 A1 | 3/2013 | Fujimoto et al. | | |

FOREIGN PATENT DOCUMENTS

| | | |
|---|---|---|
| JP | 2004140265 A | 5/2004 |
| JP | 3590524 B2 | 11/2004 |
| JP | 2006165484 A | 6/2006 |
| JP | 2013070029 A | 4/2013 |

OTHER PUBLICATIONS

International Preliminary Report on Patentability (Chapter I) and Written Opinion of the International Searching Authority; PCT/JP2016/078540; dated Apr. 2, 2019.

An Office Action mailed by the China National Intellectual Property Administration dated Jun. 1, 2020, which corresponds to Chinese Patent Application No. 201680088177.9 and is related to U.S. Appl. No. 16/266,279 with English language translation.

* cited by examiner

LASER DEVICE

CROSS REFERENCE TO RELATED APPLICATIONS

The present application is a continuation application of International Application No. PCT/JP2016/078540 filed on Sep. 27, 2016. The content of the application is incorporated herein by reference in its entirety.

BACKGROUND

1. Technical Field

The present disclosure relates to a laser device, and particularly to a discharge-excitation-type laser device.

2. Related Art

As a semiconductor integrated circuit advances in terms of miniaturization and integration, improvement in resolution is required in a semiconductor exposure apparatus. A semiconductor exposure apparatus is simply referred to as an "exposure apparatus." To achieve the improvement, the wavelength of light outputted from a light source for exposure is increasingly shortened. As the light source for exposure, a gas laser device is used in place of a conventional mercury lamp. At present, examples of the gas laser device for exposure include a KrF excimer laser device, which outputs ultraviolet light having a wavelength of 248 nm, and an ArF excimer laser device, which outputs ultraviolet light having a wavelength of 193 nm.

As the current exposure technology, liquid-immersion exposure has been put in use. In the liquid-immersion exposure, the gap between the projection lens of the exposure apparatus and a wafer is filled with a liquid so that the refractive index in the gap is changed and the apparent wavelength of the light from the light source for exposure is shortened accordingly. In the case where an ArF excimer laser device is used as the light source for exposure to perform the liquid-immersion exposure, the wafer is irradiated with ultraviolet light having an in-water wavelength of 134 nm. The technology is called ArF liquid-immersion exposure. The ArF liquid-immersion exposure is also called ArF liquid-immersion lithography.

Since KrF and ArF excimer laser devices each have a broad spectral linewidth in spontaneous laser oscillation or a spectral linewidth ranging from about 350 to 400 pm, the projection lens of the exposure apparatus produces chromatic aberrations in the laser light (ultraviolet light) projected on the wafer in the size-reduction projection, resulting in a decrease in resolution. To avoid the decrease, it is necessary to narrow the spectral linewidth of the laser light outputted from the gas laser device to the point where the chromatic aberrations are negligible. The spectrum linewidth is also called a spectrum width. To this end, a line narrowing module including a line narrowing device is provided in the laser resonator of the gas laser device, and the line narrowing module narrows the spectral width. The line narrowing device may, for example, be an etalon or a grating. The laser device that provides a narrow spectral width is called a line narrowing laser device.

CITATION LIST

Patent Literature

[PTL 1] JP-T-2003-518757
[PTL 2] Japanese Patent No. 3,590,524

SUMMARY

A laser device according to one viewpoint of the present disclosure includes a laser chamber in which a pair of discharge electrodes are disposed, a line narrowing optical system including a grating disposed in a position outside the laser chamber, a beam expander optical system that increases a diameter of a light beam, outputted from the laser chamber in a first direction parallel to a discharge direction between the discharge electrodes and in a second direction orthogonal to the discharge direction, and a holding platform that is formed as a component separate from the laser chamber and the grating, holds the beam expander optical system, and forms along with the beam expander optical system a beam expander unit.

BRIEF DESCRIPTION OF THE DRAWINGS

Embodiments of the present disclosure will be described below only by way of example with reference to the accompanying drawings.

DETAILED DESCRIPTION

Figure 1:
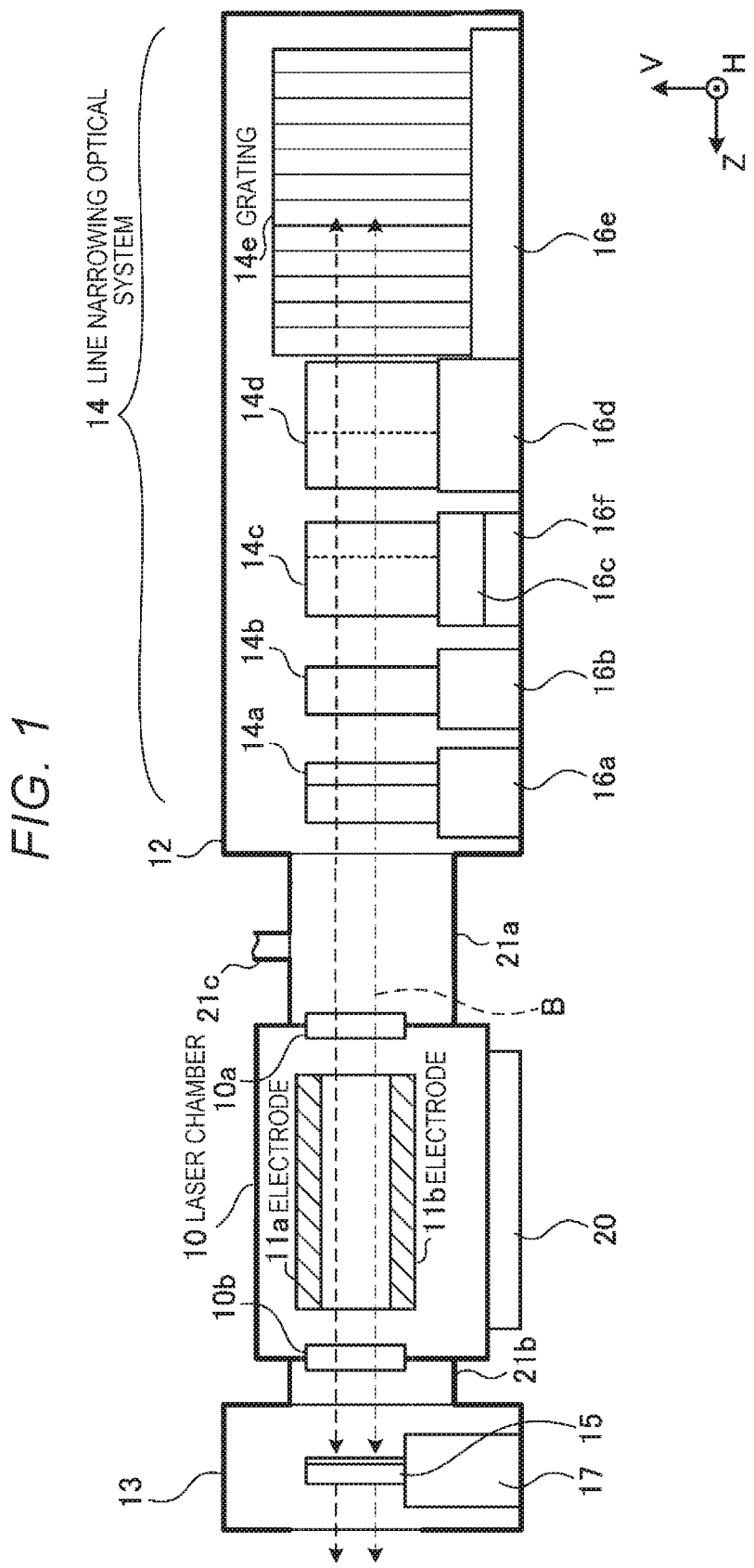
FIG. 1 is a side view diagrammatically showing a laser device according to Comparative Example.

<Contents>
1. Overview
2. Laser device including line narrowing optical system
2.1 Configuration
2.1.1 Laser chamber
2.1.2 Line narrowing optical system
2.1.3 Output coupling mirror
2.2 Operation
2.3 Problems
3.1 Configuration in first embodiment
3.2 Operation in first embodiment
3.3 Effects and advantages in first embodiment
4.1 Configuration in second embodiment
4.2 Operation in second embodiment
4.3 Effects and advantages in second embodiment
5.1 Configuration in third embodiment 5.2 Operation in third embodiment
5.3 Effects and advantages in third embodiment
6.1 Configuration in fourth embodiment
6.2 Operation in fourth embodiment
6.3 Effects and advantages in fourth embodiment
7. Others Embodiments of the present disclosure will be described below in detail with reference to the drawings. The embodiments described below show some examples of the present disclosure and are not intended to limit the contents of the present disclosure. Further, all configurations and operations described in the embodiments are not necessarily essential as configurations and operations in the present disclosure. The same component has the same reference character, and no redundant description of the same component will be made.

1. Overview

A laser device includes a laser chamber in which a pair of discharge electrodes are disposed and a line narrowing optical system including a grating disposed in a position outside the laser chamber. The laser device further includes a beam expander optical system that increases the diameter of a light beam outputted from the laser chamber and traveling toward the grating in a first direction parallel to the discharge direction between the discharge electrodes and in a second direction orthogonal to the discharge direction. The beam expander optical system is held by a holding platform formed as a component separate from the laser chamber and the grating. The holding platform and the beam expander optical system form a beam expander unit.

The terms "parallel," "orthogonal," and the like in the present disclosure do not define numerical values, such as an angle, in an exact sense but are meant to tolerate an error within a practical range. The error range is typically about ±10 degrees with respect to the exact parallelism or orthogonality.

2. Laser Device Including Line Narrowing Optical System 2.1 Configuration

Figure 2:
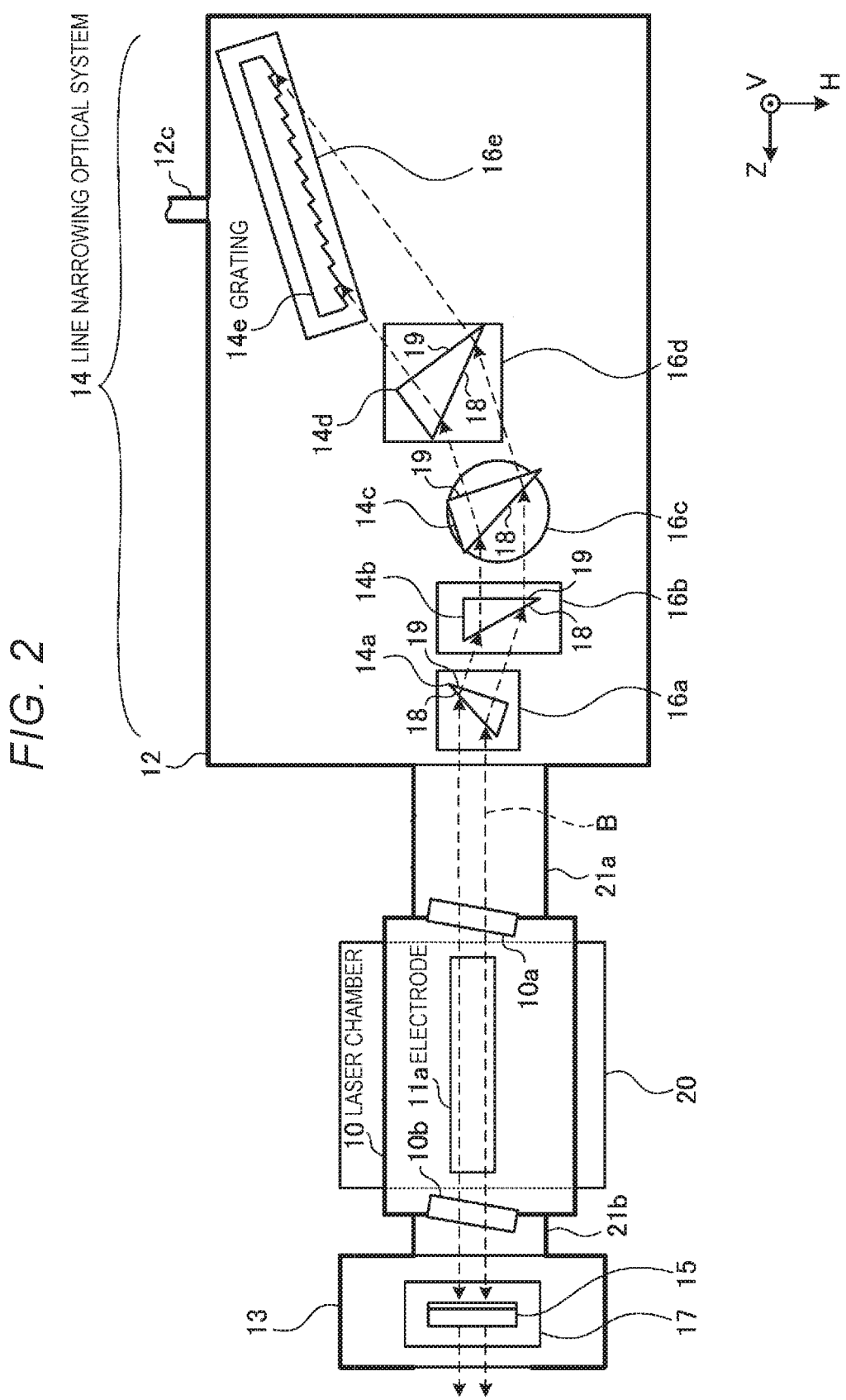
FIG. 2 is a plan view diagrammatically showing the laser device according to Comparative Example.

FIGS. 1 and 2 diagrammatically show the configuration of a laser device according to Comparative Example. The laser device shown in FIGS. 1 and 2 includes a laser chamber 10, a pair of discharge electrodes 11a, 11b, a line narrowing optical system 14, and an output coupling mirror 15. The line narrowing optical system 14 and the output coupling mirror 15 form an optical resonator. The laser chamber 10 is disposed in the optical path of the optical resonator. The laser device may be a master oscillator that causes seed light to be incident on an amplifier that is not shown to undergo laser oscillation and outputs resultant laser light.

FIG. 1 shows the internal configuration of the laser device viewed in a direction roughly orthogonal to the discharge direction between the discharge electrodes 11a and 11b. FIG. 2 shows the internal configuration of the laser device viewed in a direction roughly parallel to the discharge direction between the discharge electrodes 11a and 11b and roughly orthogonal to the traveling direction of the laser light outputted from the output coupling mirror 15. The traveling direction of the laser light outputted from the output coupling mirror 15, that is, the direction in which the optical path extends is defined as a direction Z. The direction Z is the longitudinal direction of the discharge electrodes 11a and 11b. The discharge direction between the discharge electrodes 11a and 11b is a direction V, which is orthogonal to the direction Z. The direction orthogonal to both the directions Z and V is defined as a direction H. A direction −V may roughly coincide with the direction of gravity.

2.1.1 Laser Chamber

A laser gas as a laser medium is sealed in the laser chamber 10, and the laser gas contains, for example, an argon gas or a krypton gas as a rare gas, a fluorine gas as a halogen gas, and a neon gas as a buffer gas. Windows 10a and 10b are provided at opposite ends of the laser chamber 10. The windows 10a and 10b are so disposed that laser light excited by the discharge between the discharge electrodes 11a and 11b and then amplified is incident on the windows 10a and 10b. The laser chamber 10 is supported by a holder 20.

The discharge electrodes 11a and 11b are disposed in the laser chamber 10 as electrodes for exciting the laser medium with the aid of discharge. Pulsed high voltage is applied from a pulse power module that is not shown to the discharge electrodes 11a and 11b. The windows 10a and 10b are so disposed that the plane along which the light is incident on the windows 10a and 10b is roughly parallel to a plane HZ and the angle of incidence of the light is roughly equal to Brewster's angle.

2.1.2 Line Narrowing Optical System

The line narrowing optical system 14 includes at least one prism, a grating 14e, holders 16a to 16e, and an enclosure 12. In the present example, the at least one prism is formed of four prisms 14a to 14d, which enlarge the beam in the direction H roughly orthogonal to the discharge direction. The four prisms 14a to 14d are each made of a calcium fluoride ($CaF_2$) crystal. The four prisms 14a to 14d each have two surfaces 18 and 19, through which the beam passes. The prisms 14a to 14d are so disposed that the beam that passes through the surface 18 is obliquely incident on the surface 18 and the beam that passes through the surface 19 is incident roughly orthogonally to the surface 19. The beam is refracted at the surface 18, where wavelength dispersion occurs in a plane orthogonal to an axis V. Refraction of the beam is suppressed at the surface 19. A film that suppresses reflection of a P-polarized component contained in the laser light is coated on the surface 18. A film that suppresses reflection of the laser light is coated on the surface 19. The grating 14e is an echellette grating having a surface made of a high reflectance material and having a large number of grooves formed at predetermined intervals.

The enclosure 12 accommodates the prisms 14a to 14d, the grating 14e, and the holders 16a to 16e. In the enclosure 12, the prism 14a is supported by the holder 16a, the prism 14b is supported by the holder 16b, the prism 14c is supported by the holder 16c, the prism 14d is supported by the holder 16d, and the grating 14e is supported by the holder 16e. To adjust the oscillation wavelength, the holder 16c, which holds the prism 14c, can be rotated by a rotary stage 16f around an axis parallel to the axis V.

The enclosure 12 is connected to the laser chamber 10 via an optical path tube 21a. The interior of the optical path tube 21a communicates with the interior of the enclosure 12. An inert gas introduction tube 12c is connected to the enclosure 12 in a position thereon separate from the optical path tube 21a. An inert gas discharge tube 21c is connected to the optical path tube 21a in a position thereon separate from the enclosure 12. An inert gas is so purged as to be introduced via the inert gas introduction tube 12c into the enclosure 12 and discharged via the inert gas discharge tube 21c connected to the optical path tube 21a.

2.1.3 Output Coupling Mirror

The output coupling mirror 15 is accommodated in an enclosure 13. The output coupling mirror 15 is supported by a holder 17 in the enclosure 13. A partially reflective film is coated on a surface of the output coupling mirror 15 that is the surface facing the laser chamber 10, and an antireflection film is coated on the other surface of the output coupling mirror 15.

The enclosure 13 is connected to the laser chamber 10 via an optical path tube 21b. The interior of the optical path tube 21b communicates with the interior of the enclosure 13. An inert gas introduction tube and an inert gas discharge tube that are not shown are connected to the optical path tube 21b and the enclosure 13, and an inert gas is purged into the optical path tube 21b and the enclosure 13.

2.2 Operation

When high voltage is applied across the discharge electrodes 11a and 11b, discharge occurs between the discharge electrodes 11a and 11b. The energy of the discharge excites the laser medium in the laser chamber 10, and the laser medium therefore transitions to a high-energy level. When the excited laser medium then transitions to a low-energy level, the laser medium radiates light having the wavelength according to the difference between the energy levels.

The light produced in the laser chamber 10 exits out of the laser chamber 10 through the windows 10a and 10b. The beam-shaped light having exited through the window 10a of the laser chamber 10 passes through the prisms 14a to 14d, which successively increase the diameter of the beam in the direction H, and the resultant light is incident on the grating 14e. In the following description, the beam-shaped light described above is referred to as a "light beam B" and labeled with "B" in the drawings.

The light beam B incident via the prisms 14a to 14d on the grating 14e is reflected off the plurality of grooves in the grating 14e and diffracted in the direction according to the wavelength of the light. The grating 14e is desirably disposed in the Littrow arrangement, which allows the angle of incidence of the light beam B incident via the prisms 14a to 14d on the grating 14e to coincide with the angle of diffraction of the diffracted light having a desired wavelength. The light beam B having a wavelength close to the desired wavelength thus returns into the laser chamber 10 via the prisms 14a to 14d.

The prisms 14a to 14d reduce in the direction H the diameter of the light beam B reflected and diffracted off the grating 14e and causes the light beam B to return to the discharge region in the laser chamber 10 via the window 10a.

The output coupling mirror 15 transmits and outputs part of the light beam B outputted through the window 10b of the laser chamber 10 and reflects the remainder of the light beam B back into the laser chamber 10.

The light beam B having exited out of the laser chamber 10 thus travels back and forth between the line narrowing optical system 14 and the output coupling mirror 15 and amplified whenever the light beam B passes through the discharge space between the discharge electrodes 11a and 11b, whereby the light beam B is allowed to undergo laser oscillation. The light beam B undergoes line narrowing whenever deflected back in the line narrowing optical system 14. Further, the arrangement of the windows 10a and 10b and the coatings on the prisms 14a to 14d described above allow selection of a light component linearly polarized in the direction H. The thus amplified light can be outputted as laser light via the output coupling mirror 15. The laser light may have a wavelength that belongs to the vacuum ultraviolet region. The wavelength of the laser light may be about 193.4 nm. Configuring the prism 14c to be rotatable by the rotary stage 16f as described above allows the angle of incidence of the light beam B on the grating 14e to be changed to control the oscillation wavelength of the laser light.

2.3 Problems

During the passage of the light beam B through the line narrowing optical system 14, the optical material that forms the line narrowing optical system 14 slightly absorbs the light beam B, resulting in non-uniform thermal expansion of the optical material. Similarly, the inert gas purged into the enclosure 12 slightly absorbs the light beam B, resulting in non-uniform thermal expansion, and an increase in the surface temperature of optical elements that form the line narrowing optical system 14 causes non-uniform thermal expansion of the inert gas in the vicinity of the surfaces of the optical elements. The non-uniform thermal expansion of the optical material and the inert gas in the line narrowing optical system 14 causes a non-uniform refractive index distribution along the optical path of the light beam B, resulting in distortion of the wavefront of the light beam B. The distorted wavefront of the light beam B widens the wavelength band selected by the line narrowing optical system 14, resulting in a spread of and variation in the spectral linewidth of the laser light to be outputted from the laser device.

In a case where the laser light is pulsed light, and when the energy density of the laser light at the diffraction surface of the grating 14e increases, the diffraction efficiency decreases at a speed that increases in accordance with the number of pulses of the laser light, resulting in a decrease in the life of the grating.

3.1 Configuration in First Embodiment

Figure 3:
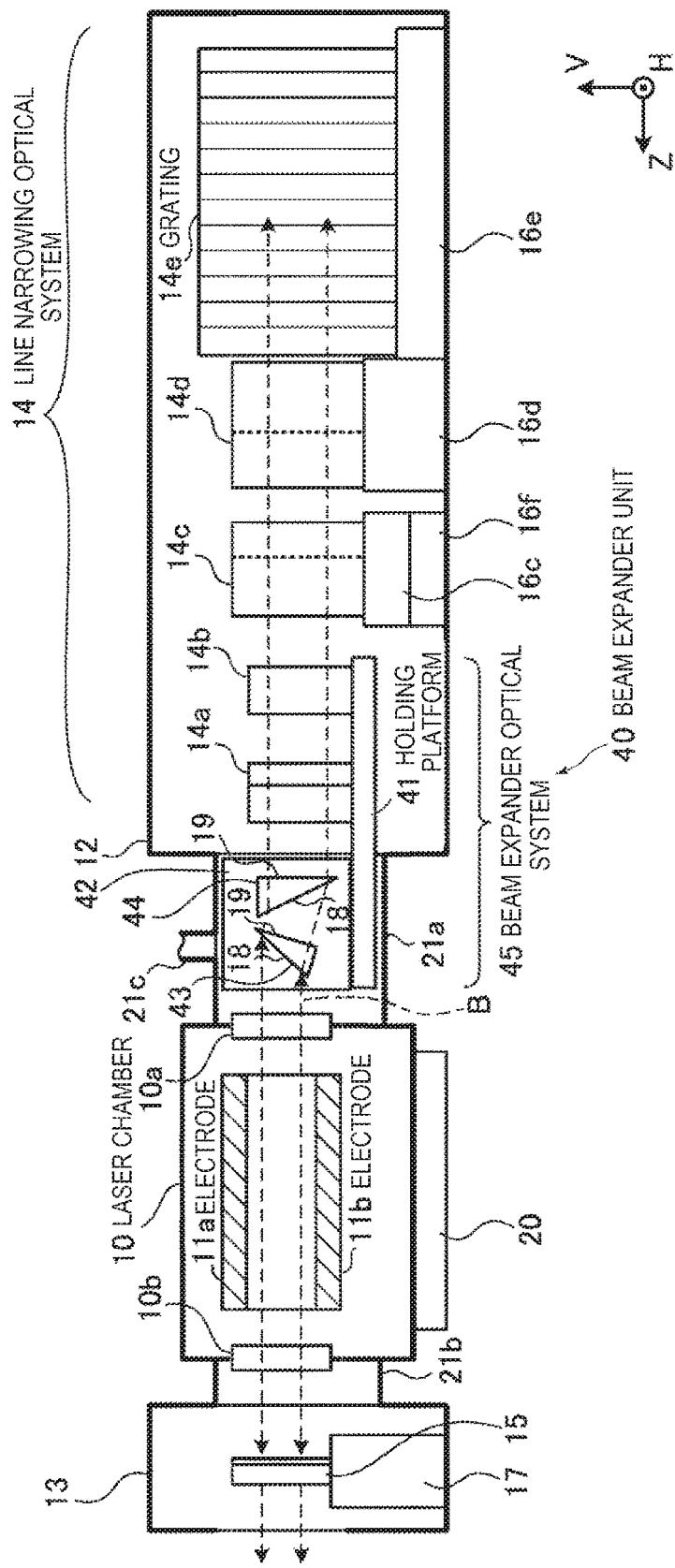
FIG. 3 is a side view diagrammatically showing a laser device according to a first embodiment.
Figure 4:
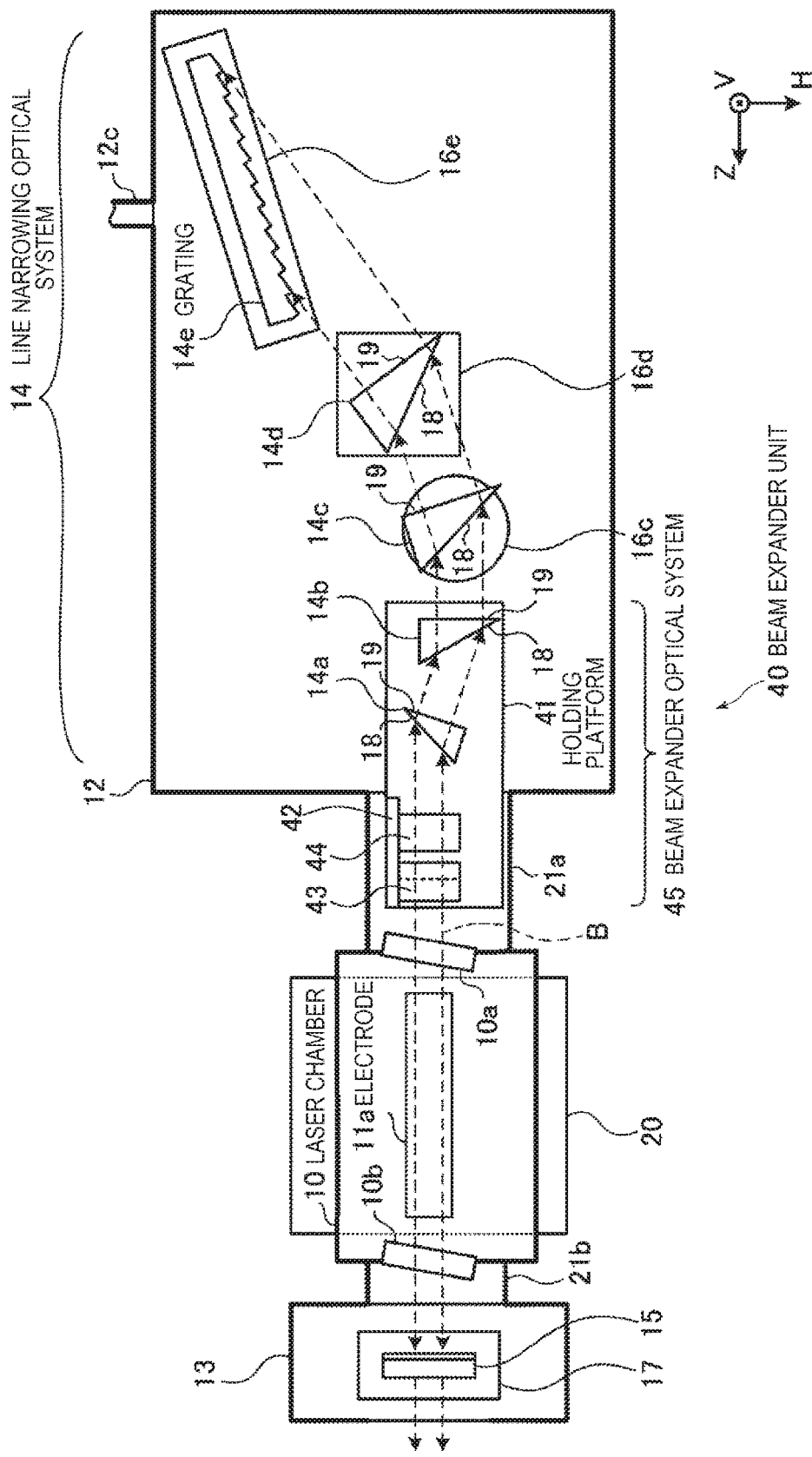
FIG. 4 is a plan view diagrammatically showing the laser device according to the first embodiment.

FIGS. 3 and 4 show a laser device according to a first embodiment of the present disclosure. The laser device according to the present embodiment differs from the laser device according to Comparative Example shown in FIGS. 1 and 2 in that the former includes a beam expander unit 40. The beam expander unit 40 increases the diameter of the light beam B outputted from the laser chamber 10 in a first direction parallel to the discharge direction between the discharge electrodes 11a and 11b and in a second direction orthogonal to the discharge direction. In the present embodiment, the first direction is the direction V, and the second direction is the direction H.

An optical system that increases the diameter of the light beam B in the direction V is formed of prisms 43 and 44 by way of example. On the other hand, an optical system that increases the diameter of the light beam B in the direction H is formed of prisms 14a and 14b by way of example. The prisms 14a and 14b can, for example, be the same prisms 14a and 14b used in the laser device according to Comparative Example described above. The beam expander unit 40 is formed of a beam expander optical system 45, which is formed of the four prisms 43, 44, 14a, and 14b, and a holding platform 41, which holds the beam expander optical system 45.

The holding platform 41 is so formed as to be separate from the laser chamber 10 and the grating 14e. The holding platform 41 is disposed in the enclosure 12, which encloses the line narrowing optical system 14, and the optical path tube 21a and attached to the enclosure 12 and the optical path tube 21a via attachment means that is not shown. The prisms 14a and 14b are fixed, for example, directly to the holding platform t 41. On the other hand, the prisms 43 and 44 are fixed to a holder 42, which is attached to the holding platform 41. The four prisms 43, 44, 14a, and 14b are so disposed that the optical path axis along which the light beam B is incident is parallel to the optical path axis along which the light beam B exits.

The holding platform 41 is desirably configured to be attachable to and detachable from the laser device, specifically, the enclosure 12 and the optical path tube 21*a*. Further, the holding platform 41 may be divided into a portion that holds the prisms 43 and 44 and a portion that holds the prisms 14*a* and 14*b*. That is, for example, the holding platform portion that holds the prisms 14*a* and 14*b* may be disposed in the enclosure 12, which encloses the line narrowing optical system 14, and the holding platform portion that holds the prisms 43 and 44 may be disposed between the enclosure 12 and the laser chamber 10.

The prisms 43, 44, 14*a*, and 14*b* are each made of a calcium fluoride ($CaF_2$) crystal. The prisms 43, 44, 14*a*, and 14*b* each have two surfaces 18 and 19, through which the light beam B passes. The prisms 43, 44, 14*a*, and 14*b* are so disposed that the beam that passes through the surface 18 is obliquely incident on the surface 18 and the beam that passes through the surface 19 is incident roughly orthogonally to the surface 19. The light beam B is refracted at the surface 18, and refraction of the light beam B at the surface 19 is suppressed.

The prisms 14*a* and 14*b* cause the light beam B to undergo wavelength dispersion in a plane HZ, as do the prisms 14*c* and 14*d* in the line narrowing optical system 14. That is, in the present embodiment, the prisms 14*a* and 14*b* also form part of the line narrowing optical system 14.

A film that reduces reflection of an S-polarized component contained in the light beam B is coated on the surface 18 of each of the prisms 43 and 44, on which the light beam B is incident. On the other hand, a film that reduces reflection of a P-polarized component contained in the light beam B is coated on the surface 18 of each of the prisms 14*a* and 14*b*, on which the light beam B is incident. A film that suppresses reflection of the light beam B is coated on the surface 19 of each of the prisms 43, 44, 14*a*, and 14*b*.

3.2 Operation in First Embodiment

The light beam B outputted from the laser chamber 10 and traveling toward the grating 14*e* passes through the prisms 43 and 44, which increase the diameter of the beam in the first direction, that is, the direction V. Since the film that reduces reflection of the S-polarized component contained in the light beam B is coated on the surface 18 of each of the prisms 43 and 44, on which the light beam B is incident, the component that forms the light beam B and is linearly polarized in the direction H passes through the prisms 43 and 44 by a large amount.

The light beam B enlarged in the direction V then passes through the prisms 14*a* and 14*b*, which increase the diameter of the beam in the second direction, that is, the direction H. Since the film that reduces reflection of the P-polarized component contained in the light beam B is coated on the surface 18 of each of the prisms 14*a* and 14*b*, on which the light beam B is incident, the component that forms the light beam B and is linearly polarized in the direction H passes through the prisms 14*a* and 14*b* by a large amount.

The light beam B enlarged in the directions H and V as described above then successively enters the prisms 14*c* and 14*d* and the grating 14*e* in the line narrowing optical system 14. In the present embodiment, the prisms 14*a* and 14*b* also form part of the line narrowing optical system 14, as described above.

The line narrowing optical system 14 causes the light beam B to undergo line narrowing, as in Comparative Example described above. The light beam B having undergone the line narrowing is amplified when the laser beam B enters the laser chamber 10 again and passes through the discharge region. As a result, pulsed laser light having undergone the line narrowing and having a large amount of component linearly polarized in the direction H exits through the output coupling mirror 15.

3.3 Effects and Advantages in First Embodiment

The light beam B is incident on the optical elements that form the line narrowing optical system 14, such as the grating 14*e*, with the diameter of the light beam B increased in both the directions V and H. Heat load on the optical elements described above is therefore reduced. As a result, the distortion of the wavefront of the light beam B in the line narrowing optical system 14 is reduced, whereby variation in the spectral waveform of the pulsed laser light outputted through the output coupling mirror 15 is suppressed.

Further, since the energy density of the light beam B incident on the diffraction surface of the grating 14*e* decreases, the decrease in the diffraction efficiency of the grating 14*e* is suppressed, whereby the life of the grating 14*e* is prolonged.

Moreover, since the film that reduces reflection of S-polarized light is coated on the surface 18 of each of the prisms 43 and 44, which increase the diameter of the light beam B in the direction V, loss of the component that forms the light beam B and linearly polarized in the direction H is suppressed. As a result, loss caused by the prisms 43 and 44 can be suppressed to several percent or lower.

In particular, the laser device to and from which the holding platform 41 is attachable and detachable can be compatible with a laser device so configured that the prisms 14*a* and 14*b* are fixed in the enclosure 12. That is, in this case, in place of the prisms 14*a* and 14*b* fixed in the enclosure 12, the prisms 14*a* and 14*b* provided in the beam expander unit 40 can be used.

4.1 Configuration in Second Embodiment

Figure 5:
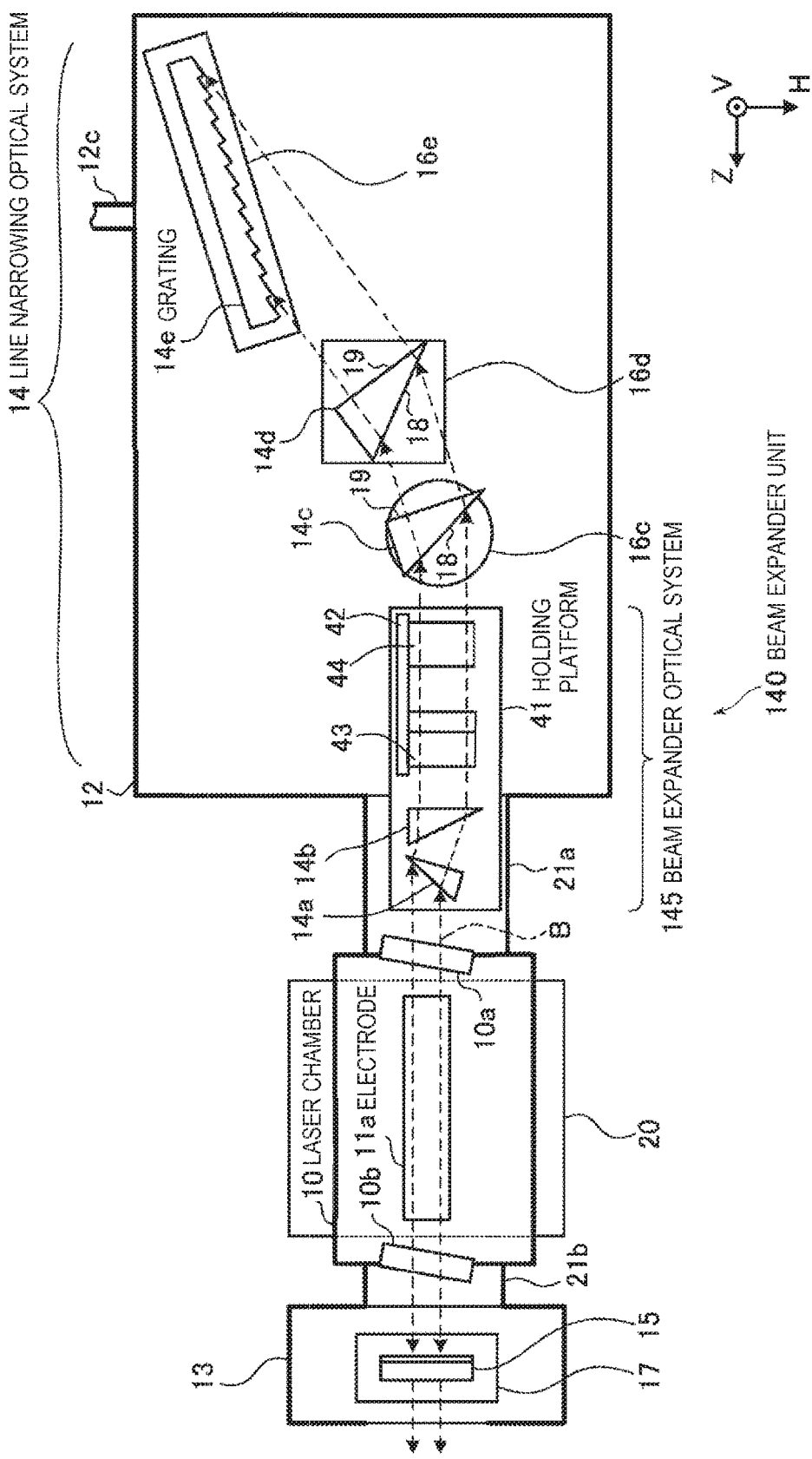
FIG. 5 is a plan view diagrammatically showing a laser device according to a second embodiment.

FIG. 5 shows a laser device according to a second embodiment of the present disclosure. The laser device according to the present embodiment differs from the laser device according to the first embodiment shown in FIGS. 3 and 4 in terms of the configuration of the beam expander unit. That is, in a beam expander optical system 145 in a beam expander unit 140 employed in the present embodiment, the prisms 14*a* and 14*b*, which increase the diameter of the light beam B in the second direction, that is, the direction H, are disposed in positions closer to the laser chamber 10 than the prisms 43 and 44. The prisms 43 and 44, which increase the diameter of the light beam B in the first direction, that is, the direction V, are disposed in positions closer to the grating 14*e* than the prisms 14*a* and 14*b*. The magnification by which the prisms 43 and 44 increase the beam diameter in the first direction preferably ranges from 1.5 to 4. On the other hand, the magnification by which the prisms 14*a* and 14*b* increase the beam diameter in the second direction preferably ranges from 3 to 5.

Also in the configuration in the present embodiment, the holding platform 41 may be attachable to and detachable from the laser device. Further, the holding platform 41 may be divided into a portion that holds the prisms 43 and 44 and a portion that holds the prisms 14*a* and 14*b*. That is, the holding platform portion that holds the prisms 43 and 44 may be disposed in the enclosure 12, which encloses the line narrowing optical system 14, and the holding platform portion that holds the prisms 14*a* and 14*b* may be disposed between the enclosure 12 and the laser chamber 10.

4.2 Operation in Second Embodiment

The light beam B outputted from the laser chamber 10 and traveling toward the grating 14*e* passes through the prisms 14a and 14b, which increase the diameter of the beam in the second direction, that is, the direction H. Since the film that reduces reflection of the P-polarized component contained in the light beam B is coated on the surface 18 of each of the prisms 14a and 14b, on which the light beam B is incident, the component that forms the light beam B and is linearly polarized in the direction H passes through the prisms 14a and 14b by a large amount.

The light beam B enlarged in the direction H then passes through the prisms 43 and 44, which increase the diameter of the beam in the first direction, that is, the direction V. Since the film that reduces reflection of the S-polarized component contained in the light beam B is coated on the surface 18 of each of the prisms 43 and 44, on which the light beam B is incident, the component that forms the light beam B and is linearly polarized in the direction H passes through the prisms 43 and 44 by a large amount.

The light beam B enlarged in the directions H and V as described above then successively enters the prisms 14c and 14d and the grating 14e in the line narrowing optical system 14. In the present embodiment, the prisms 14a and 14b also form part of the line narrowing optical system 14.

4.3 Effects and Advantages in Second Embodiment

The same effects and advantages as those provided by the first embodiment are basically provided.

5.1 Configuration in Third Embodiment

Figure 6:
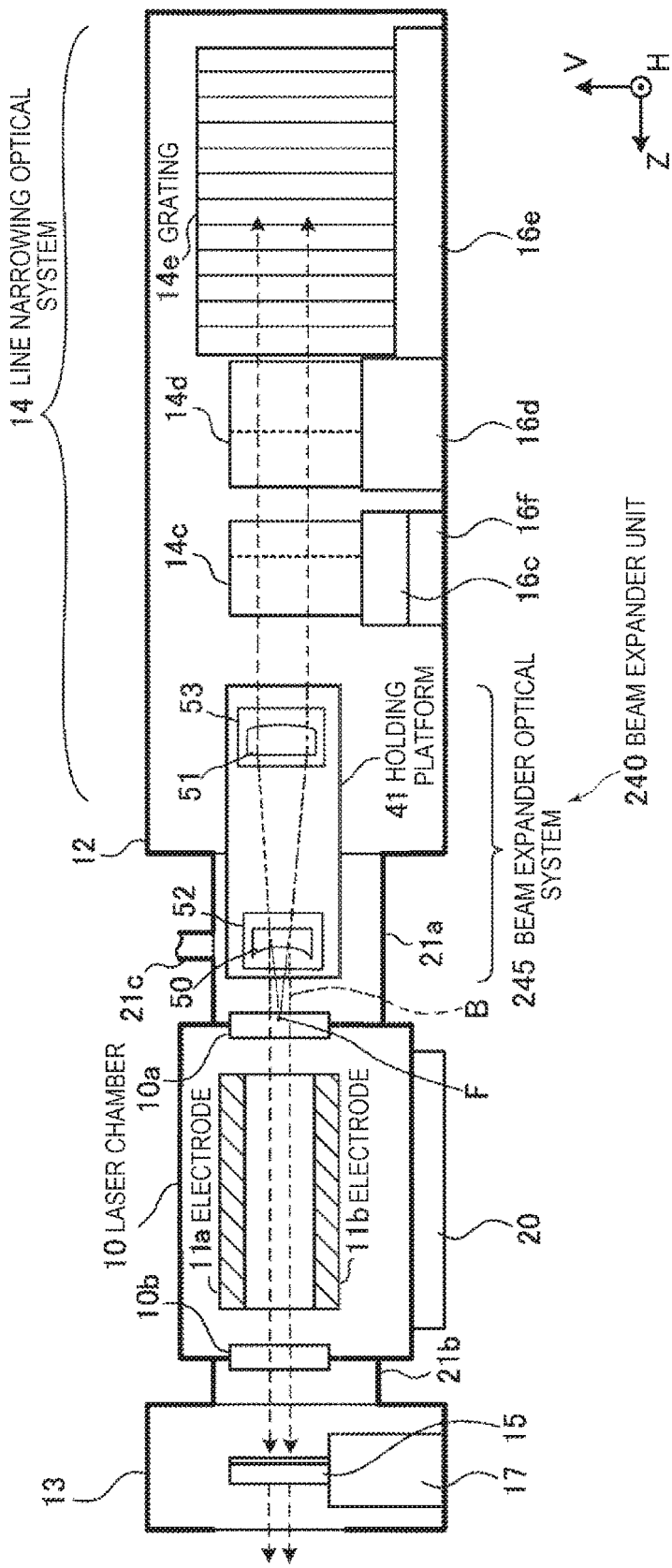
FIG. 6 is a side view diagrammatically showing a laser device according to a third embodiment.
Figure 7:
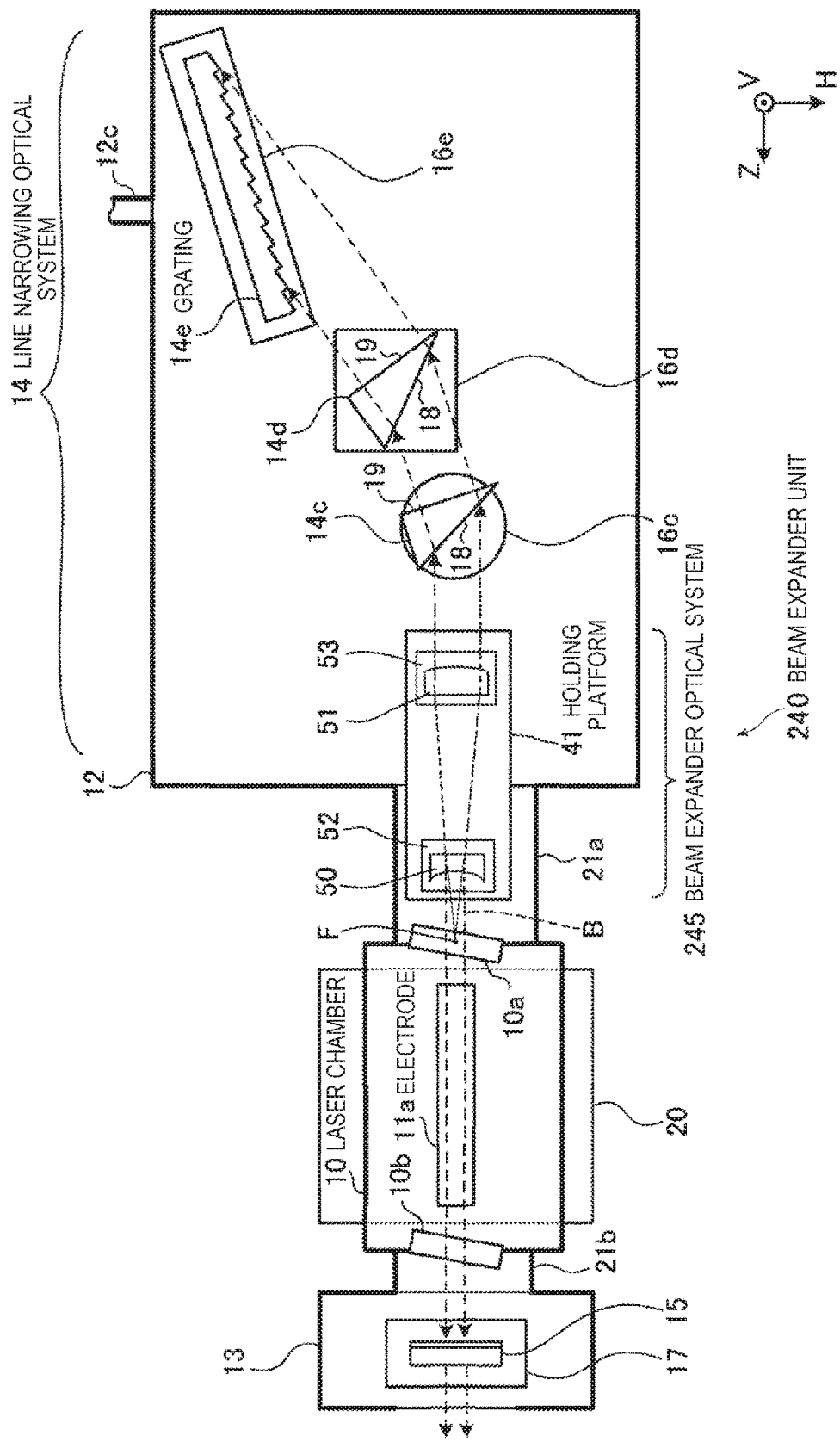
FIG. 7 is a plan view diagrammatically showing the laser device according to the third embodiment.

FIGS. 6 and 7 show a laser device according to a third embodiment of the present disclosure. The laser device according to the present embodiment differs from the laser device according to the first embodiment shown in FIGS. 3 and 4 in terms of the configuration of the beam expander unit. That is, a beam expander optical system 245 in a beam expander unit 240 employed in the present embodiment includes two spherical lenses and increases the diameter of the light beam B in the directions V and H by the same magnification M.

More specifically, the two spherical lenses described above are a concave lens 50 and a convex lens 51. The lenses 50 and 51 are each made of a calcium fluoride (CaF$_2$) crystal. A reflection reducing film is coated on each light passage surface of the lenses 50 and 51. The concave lens 50 is fixed to the holding platform 41 via a holder 52, and the convex lens 51 is fixed to the holding platform 41 via a holder 53. Reference character F in FIGS. 6 and 7 represents the focal points of the concave lens 50 and the convex lens 51, and the focal points coincide with each other.

Figure 8:
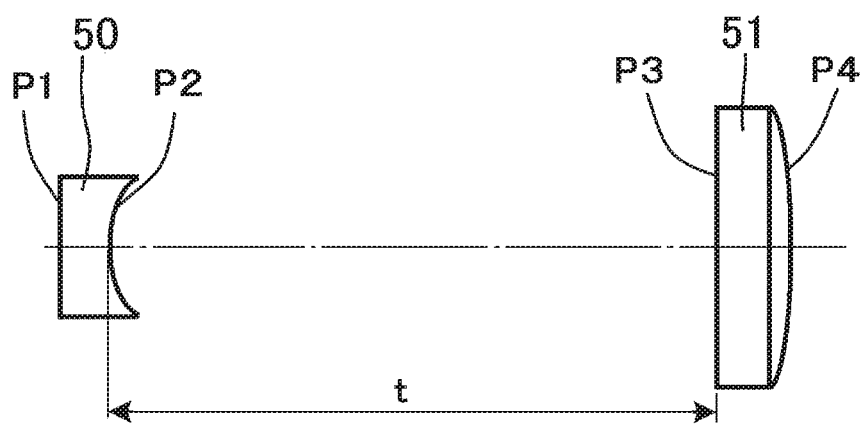
FIG. 8 is a schematic view showing lenses used in the third embodiment.

The magnification M provided by the concave lens 50 and the convex lens 51 preferably ranges from 3 to 5 and is more preferably about 4. Table 1 shows preferable examples of the radius of curvature of each light passage surface of the concave lens 50 and the convex lens 51 and an inter-surface distance t between the two lenses for each wavelength λ of the light beam B. FIG. 8 shows light passage surfaces P1 to P4 and the inter-surface distance t in the preferable examples. FIG. 8 shows a case where a plano-concave lens is used as the concave lens 50 and a plano-convex lens is used as the convex lens 51. In the present example, however, Table 1 shows numerical values in a case where the concave surface of the concave lens 50 faces the convex lens 51, unlike the configuration in FIGS. 6 and 7. The units of the numerical values shown in Table 1 are as follows: The wavelength λ is expressed in nm; and the other numerical values are expressed in mm. It is assumed that the radius of curvature has a positive value in a case where a light passage surface is convex toward the light incident side, that is, toward the laser chamber 10, and that the radius of curvature has a negative value in a case where a light passage surface is concave toward the light incident side, that is, toward the laser chamber 10. The magnification provided by the lenses 50 and 51 is 3.9.

TABLE 1

| Wavelength λ | Inter-surface distance t | Radius of curvature of P1 | Radius of curvature of P2 | Radius of curvature of P3 | Radius of curvature of P4 |
|---|---|---|---|---|---|
| 193.300 | 239.887 | ∞ | 44.1 | ∞ | −171.0 |
| 193.368 | 239.895 | ∞ | 44.1 | ∞ | −171.0 |
| 193.457 | 239.909 | ∞ | 44.1 | ∞ | −171.0 |

In the present embodiment, the beam expander unit 240 is formed of the two spherical lenses, but not necessarily, and another spherical lens may be added to shorten the size of the beam expander unit in the optical path direction and suppress aberrations of the wavefront. Further, the beam expander unit formed of lenses may be configured to include a set of aspherical lenses.

5.2 Operation in Third Embodiment

The light beam B outputted from the laser chamber 10 and traveling toward the grating 14e passes through the concave lens 50 and the convex lens 51, which increase the diameter of the beam in the directions V and H by the same magnification. Since the reflection reducing film is coated on each light passage surface of the lenses 50 and 51, the component that forms the light beam B and is linearly polarized in the direction V and the component that forms the light beam B and is linearly polarized in the direction H both pass through the lenses 50 and 51 by a large amount.

The light beam B enlarged in the directions V and H as described above then successively enters the prisms 14c and 14d and the grating 14e in the line narrowing optical system 14.

5.3 Effects and Advantages in Third Embodiment

In the present embodiment, the concave lens 50 and the convex lens 51, which are two spherical lenses, increase the diameter of the light beam B in the directions V and H by the same magnification and allow the optical path axis along which the light beam B is incident to roughly coincide with the optical path axis along which the light beam B exits.

The light beam B is incident on the optical elements that form the line narrowing optical system 14, such as the grating 14e, with the diameter of the light beam B increased in both the directions V and H. Heat load on the optical elements described above is therefore reduced. As a result, the distortion of the wavefront of the light beam B in the line narrowing optical system 14 is reduced, whereby variation in the spectral waveform of the pulsed laser light outputted through the output coupling mirror 15 is suppressed.

Further, since the energy density of the light beam B incident on the diffraction surface of the grating 14e decreases, the decrease in the diffraction efficiency of the grating 14e is suppressed, whereby the life of the grating 14e is prolonged.

Further, since the two lenses 50 and 51 are used in the present embodiment, unlike in the configurations in the first and second embodiments described above, in which four prisms are used in the beam expander unit, the number of optical elements can be reduced.

6.1 Configuration in Fourth Embodiment

Figure 9:
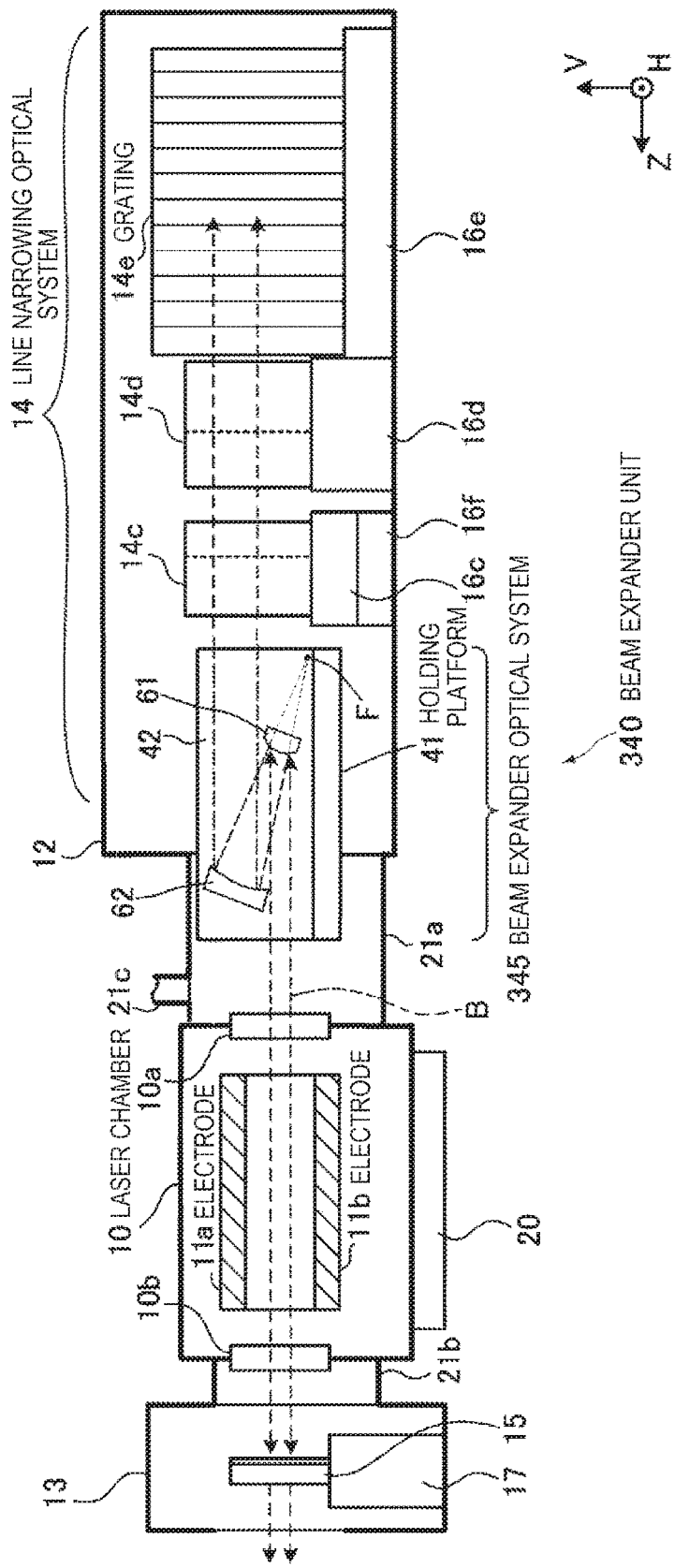
FIG. 9 is a side view diagrammatically showing a laser device according to a fourth embodiment.
Figure 10:
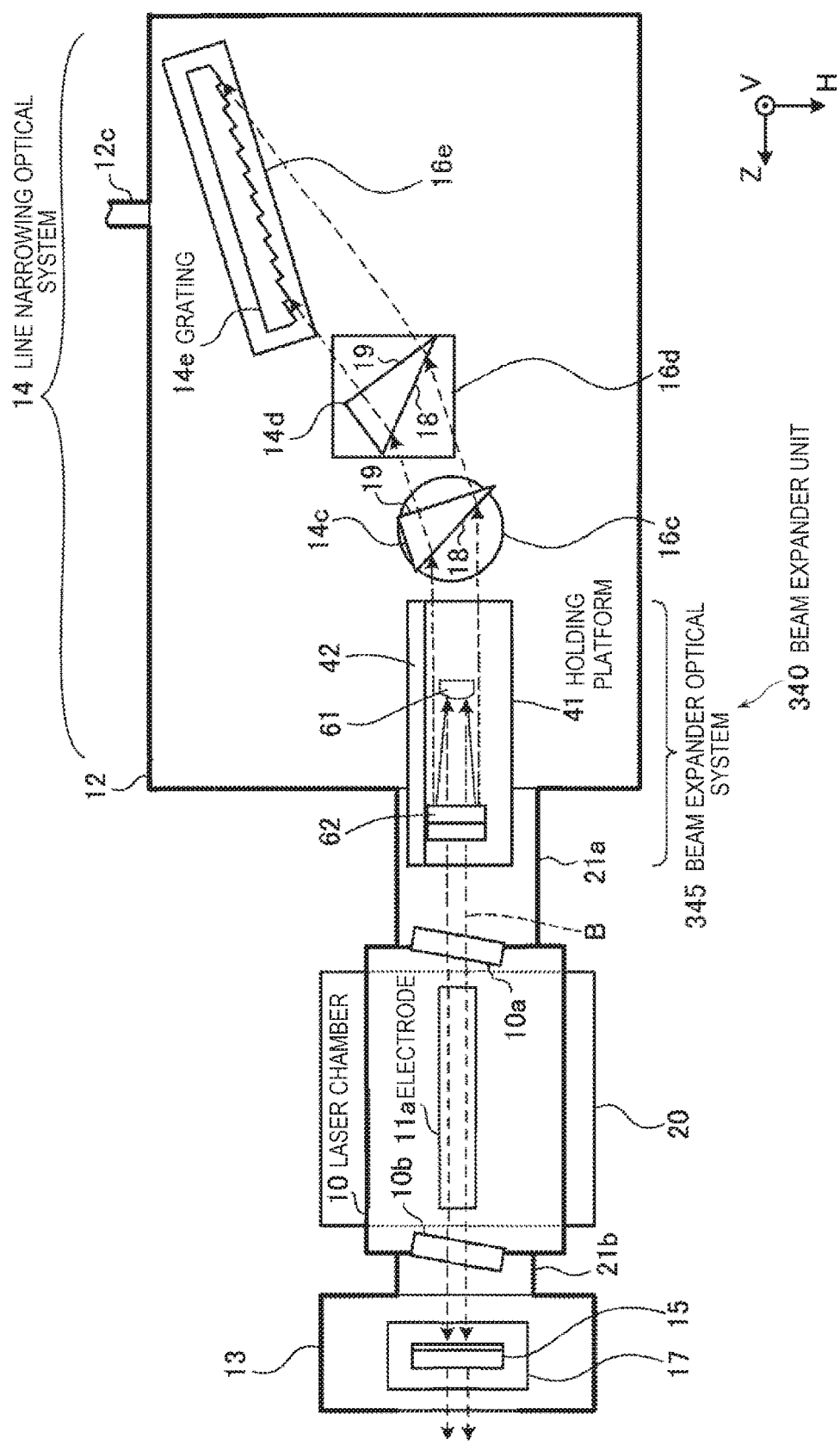
FIG. 10 is a plan view diagrammatically showing the laser device according to the fourth embodiment.

FIGS. 9 and 10 show a laser device according to a fourth embodiment of the present disclosure. The laser device according to the present embodiment differs from the laser device according to the first embodiment shown in FIGS. 3 and 4 in terms of the configuration of the beam expander unit. That is, a beam expander optical system 345 in a beam expander unit 340 employed in the present embodiment includes two spherical lenses and increases the diameter of the light beam B in the directions V and H by the same magnification M.

More specifically, the two spherical lenses described above are a convex mirror 61 and a concave mirror 62. The light reflection surface of each of the mirrors 61 and 62 has an off-axis paraboloidal surface shape, and a film that reflects at least S-polarized light by a large amount is coated on the light reflection surface of each of the mirrors. Reference character F in FIG. 9 represents the focal points of the convex mirror 61 and the concave mirror 62, and the two mirrors 61 and 62 are so disposed that the focal points coincide with each other. The mirrors 61 and 62 are each fixed to the holding platform 41 via a holder that is not shown.

The magnification M provided by the convex mirror 61 and the concave mirror 62 preferably ranges from 3 to 5 and is more preferably about 4.

6.2 Operation in Fourth Embodiment

The light beam B outputted from the laser chamber 10 and traveling toward the grating 14e is reflected off the convex mirror 61 and the concave mirror 62, which increase the diameter of the beam in the directions V and H by the same magnification. Since the film that reflects S-polarized light by a large amount is coated on each light reflection surface of the mirrors 61 and 62, the component that forms the light beam B and is linearly polarized in the direction H is reflected off the mirrors 61 and 62 by a large amount.

The light beam B enlarged in the directions V and H as described above then successively enters the prisms 14c and 14d and the grating 14e in the line narrowing optical system 14.

6.3 Effects and Advantages in Fourth Embodiment

In the present embodiment, the convex mirror 61 and the concave mirror 62, which are two spherical mirrors, increase the diameter of the light beam B in the directions V and H by the same magnification and allow the optical path axis along which the light beam B is incident to roughly be parallel to the optical path axis along which the light beam B exits.

The light beam B is incident on the optical elements that form the line narrowing optical system 14, such as the grating 14e, with the diameter of the light beam B increased in both the directions V and H. Heat load on the optical elements described above is therefore reduced. As a result, the distortion of the wavefront of the light beam B in the line narrowing optical system 14 is reduced, whereby variation in the spectral waveform of the pulsed laser light outputted through the output coupling mirror 15 is suppressed.

Further, since the energy density of the light beam B incident on the diffraction surface of the grating 14e decreases, the decrease in the diffraction efficiency of the grating 14e is suppressed, whereby the life of the grating 14e is prolonged.

Further, since the two mirrors 61 and 62 are used in the present embodiment, unlike in the configurations in the first and second embodiments described above, in which four prisms are used in the beam expander unit, the number of optical elements can be reduced.

Further, in the present embodiment, since the two mirrors 61 and 62 are used in the beam expander unit 340, no chromatic aberration occurs in the beam expander unit, unlike in the case where the beam expander unit is formed of lenses. A change in the wavefront of the light beam B is therefore suppressed even when the oscillation wavelength of the laser device changes.

7. Others

The above description is intended not to be limiting but merely to exemplary. It will therefore be apparent for a person skilled in the art that the embodiments of the present disclosure can be changed without departing from the accompanying claims.

The terms used in the entire specification and accompanying claims should each be construed as a "non-limiting" term. For example, the term "include" or "included" should be construed as "does not necessarily include only what is described." The term "have" should be construed as "does not necessarily have only what is described." Further, an indefinite article "a" described in the present specification and the accompanying claims should be construed as a term that means "at least one" or "one or more."

What is claimed is:

1. A laser device comprising:
   a laser chamber in which a pair of discharge electrodes are disposed;
   a line narrowing optical system including a grating accommodated by an enclosure disposed in a position outside the laser chamber;
   an optical path tube connecting the enclosure and the laser chamber;
   a beam expander optical system that increases a diameter of a light beam, outputted from the laser chamber and traveling toward the grating, in a first direction parallel to a discharge direction between the discharge electrodes and in a second direction orthogonal to the discharge direction; and
   a holding platform that is formed as a component separate from the laser chamber and the grating, holds the beam expander optical system, and forms along with the beam expander optical system a beam expander unit, a part of the holding platform being disposed in the enclosure and another part of the holding platform being disposed in the optical path tube.

2. The laser device according to claim 1, wherein the beam expander optical system is so disposed that an optical path axis along which the light beam is incident is parallel to an optical path axis along which the light beam exits.

3. The laser device according to claim 1, wherein the beam expander optical system includes at least four prisms.

4. The laser device according to claim 3, wherein the four prisms are formed of two prisms that increase the diameter of the optical beam in the first direction and two prisms that are so disposed in positions closer to the grating than the two prisms that increase the diameter of the optical beam in the first direction and increase the diameter of the optical beam in the second direction.

5. The laser device according to claim 3, wherein the four prisms are formed of two prisms that increase the diameter of the optical beam in the second direction and two prisms that are so disposed in positions closer to the grating than the two prisms that increase the diameter of the optical beam in the second direction and increase the diameter of the optical beam in the first direction.

6. The laser device according to claim 3,
   wherein the four prisms are formed of two prisms that increase the diameter of the optical beam in the first direction and two prisms that increase the diameter of the optical beam in the second direction,
   a film that suppresses reflection of S-polarized light is coated on a surface of each of the two prisms that increase the diameter of the optical beam in the first direction, the surface being a surface on which the light beam is obliquely incident, and a film that suppresses reflection of P-polarized light is coated on a surface of each of the two prisms that increase the diameter of the optical beam in the second direction, the surface being a surface on which the light beam is obliquely incident.

7. The laser device according to claim 3, wherein the four prisms are formed of two prisms that increase the diameter of the optical beam in the first direction and two prisms that increase the diameter of the optical beam in the second direction, and a film that suppresses reflection of the light beam is coated on a surface of each of the four prisms, the surface being a surface on which the light beam is orthogonally incident.

8. The laser device according to claim 3, wherein a magnification by which the four prisms increase the diameter of the light beam in the first direction ranges from 1.5 to 4 and a magnification by which the four prisms increase the diameter of the light beam in the second direction ranges from 3 to 5.

9. The laser device according to claim 1, wherein the beam expander optical system includes a concave lens and a convex lens.

10. The laser device according to claim 1, wherein the beam expander optical system includes a concave mirror and a convex mirror.

11. The laser device according to claim 1, wherein the holding platform is configured to be attachable to and detachable from the laser device.

12. The laser device according to claim 1, wherein the holding platform is divided into a portion that holds an optical system that increases the diameter of the light beam in the first direction and a portion that holds an optical system that increases the diameter of the light beam in the second direction.

13. The laser device according to claim 1, wherein the line narrowing optical system includes not only the grating but a prism that increases the diameter of the light beam in the second direction.

14. A laser device comprising:

a laser chamber in which a pair of discharge electrodes are disposed;

a line narrowing optical system including a grating disposed in a position outside the laser chamber;

a beam expander optical system that increases a diameter of a light beam, outputted from the laser chamber and traveling toward the grating, in a first direction parallel to a discharge direction between the discharge electrodes and in a second direction orthogonal to the discharge direction, the beam expander optical system including first and second prisms that increase the diameter of the optical beam in the first direction and third and fourth prisms that increase the diameter of the optical beam in the second direction, the beam expander optical system being so disposed that the optical path axis along which the light beam is incident is parallel to the optical path axis along which the light beam exits;

a holder that holds the first and second prisms; and a holding platform that is formed as a component separate from the laser chamber and the grating, holds the beam expander optical system by holding the holder and the third and fourth prisms, and forms along with the beam expander optical system a beam expander unit.

15. The laser device according to claim 14, wherein the third and fourth prisms are so disposed in positions closer to the grating than the first and second prisms.

16. The laser device according to claim 14, wherein a film that suppresses reflection of S-polarized light is coated on a surface of each of the first and second prisms, the surface being a surface on which the light beam is obliquely incident, and a film that suppresses reflection of P-polarized light is coated on a surface of each of the third and fourth prisms, the surface being a surface on which the light beam is obliquely incident.

17. The laser device according to claim 14, wherein a film that suppresses reflection of the light beam is coated on a surface of each of the first to fourth prisms, the surface being a surface on which the light beam is orthogonally incident.

18. The laser device according to claim 14, wherein a magnification by which the first and second prisms increase the diameter of the light beam in the first direction ranges from 1.5 to 4 and a magnification by which the third and fourth prisms increase the diameter of the light beam in the second direction ranges from 3 to 5.

19. The laser device according to claim 14, wherein the holding platform is configured to be attachable to and detachable from the laser device.

20. The laser device according to claim 14, wherein the line narrowing optical system includes not only the grating but a prism that increases the diameter of the light beam in the second direction.

* * * * *